July 23, 1946. W. STELZER 2,404,544
AIRCRAFT
Filed Feb. 9, 1943
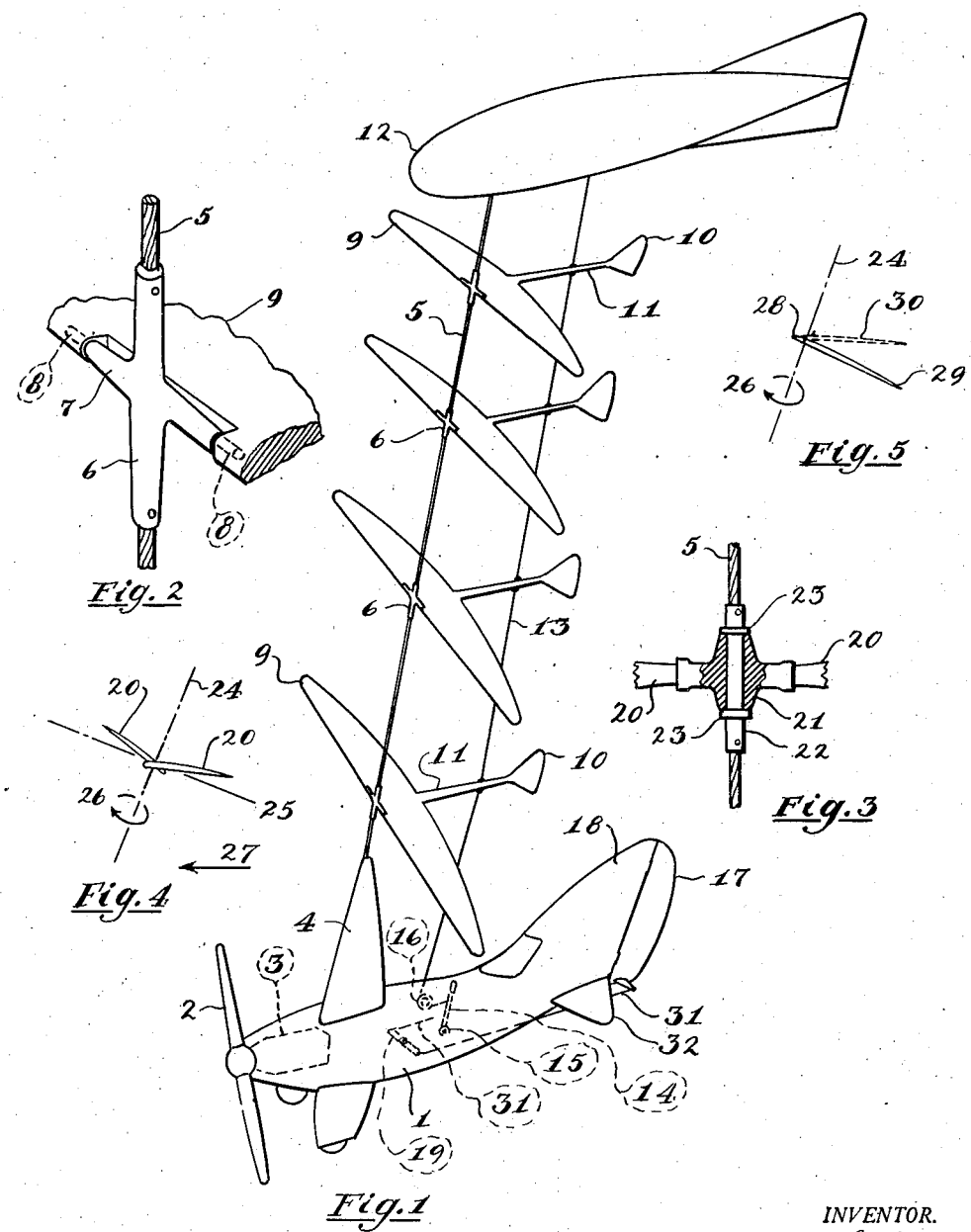
INVENTOR.
William Stelzer Patented July 23, 1946

2,404,544

UNITED STATES PATENT OFFICE 2,404,544

AIRCRAFT

William Stelzer, Detroit, Mich.

Application February 9, 1943, Serial No. 475,237

2 Claims. (Cl. 244—34)

The invention relates to aircraft and more particularly to a flying machine having a plurality of superposed carrying surfaces suspended beneath a kite-balloon.

The object of the invention is to provide a safe and novel airplane with a greatly reduced wing loading and an increased wing area, to be capable of flying at a very low speed.

It it known that the size and carrying capacity of conventional airplanes is limited because of the difficulty to maintain rigidity of the structure without a prohibitive increase in weight and the necessity of maintaining a high speed to sustain itself in flight. There is a definite need for an aircraft capable of flying at very low speed or of carrying large loads that cannot be carried by conventional means.

To accomplish this, I provide a plurality of superposed carrying surfaces with a tensile member to transmit the lift, whereby the carrying surfaces are in no rigid relation with each other.

In order to make such a construction stable in flight, a kite-balloon is provided at the top to hold all wings or carrying surfaces in suspension.

An important aim of the invention is to coordinate all carrying surfaces to operate in unison while their structural flexibility with relation to each other is maintained.

Other objects and advantages of this invention will be apparent from the following detailed description considered in connection with the accompanying drawing submitted for the purpose of illustration and not intended to define the scope of the invention, reference being had for that purpose to the subjoined claims. In the drawing, wherein similar reference characters refer to similar parts throughout the several views:

Fig. 1 is a perspective view of the novel airplane;

Fig. 2, a perspective detail view showing the method of securing a carrying surface to the tensile member;

Fig. 3, a fragmentary cross-sectional elevation showing a modified carrying surface rotatable on a swivel;

Fig. 4, a diagrammatic illustration of the wing setting of the modified construction shown in Fig. 3; and Fig. 5, a diagram showing how the wings in Fig. 3 may be set resiliently to assume the proper angle automatically.

Before explaining the present invention in detail it is to be understood that the invention is not limited in its application to the details of construction and arrangement of parts, illustrated in the accompanying drawing, since the invention is capable of other embodiments and of being practised or carried out in various ways. Also it is to be understood that the phraseology or terminology employed herein is for the purpose of description and not limitation.

The novel flying machine comprises a fuselage 1 propelled by an air screw 2 driven by a power plant 3. A fin 4 extending upwardly has attached to it a tensile member such as a cable or wire 5 to which are clamped tubular members 6 having lateral arms 7 whose extremities have trunnions 8 (shown in Fig. 2) pivotally engaging carrying surfaces 9 at a point forward of their center of pressure. Each carrying surface 9 is equipped with a fin 10 at the end of a longeron 11.

The upper end of cable 5 is secured to a kite-balloon 12 whose purpose is to hold up the wings when the lift is insufficient, as for instance before the plane is in flight. This kite-balloon gives the plane an inherent stability as it holds the upper wings in a position where they produce lift.

The control means of the novel airplane comprise a control cable 13 connecting all longerons 11 and balloon 12 whereby the angle of attack of the wings may be controlled by raising or lowering said control cable, which operation in this embodiment may be accomplished by means of a joy stick 14 pivoted to the fuselage at 15, 16 designating a sheave. Directional control is provided with a rudder 17 hinged to fin 18 and operated by means of a rudder bar 19 and wires 31 in a conventional manner. 32 is an elevator fin, which may be provided with operable elevators. However, the latter are not essential to the functioning of the airplane and therefore are not shown specifically.

It is apparent that instead of the airfoils 9 other types of carrying surfaces may be used. In the modified embodiment in Fig. 3 I use pairs of rotatable wings 20 secured to a hub 21 revolvable about tubular shafts 22 clamped to cable 5 and having thrust collars 23. The airfoils 20 are arranged in a similar manner as the blades of a gyroplane, having a negative setting as shown in Fig. 4, where 24 indicates the axis about which the wings rotate, 25 the "propeller plane," 26 the direction of rotation, and arrow 27 the direction of traction. In this embodiment control cable 13 is eliminated.

The fixed wing setting described has the disadvantage that during forward travel the advancing wing produces more lift than the retreating wing, causing a certain flapping motion which is permitted due to the flexibility of cable 5. Where this flapping motion (which is a known characteristic of present day gyroplanes) is objectionable I propose to use a modified wing construction as shown in Fig. 5. For simplicity only one wing is shown. The latter has a rigid leading edge 28 whose root is secured to hub 21 in a manner similar to blade 20. Secured to said leading edge are skin covered resilient ribs 29 urged in a position as shown where the angle of wing setting is approximately zero. The lift produced by the wing urges the latter to decrease the angle of attack which position is illustrated by numeral 30. Thus during a rotation the wing changes its setting to produce a more uniform lift.

In operation, assuming that the embodiment shown in Fig. 1 is on the ground and ready to take off, the wings 9 are raised by virtue of the static lift of balloon 12, so that as soon as the plane is propelled forwardly by means of propeller 2, lift is produced by them. When the forward speed is accelerated, the lift may be increased by pulling back joy stick 14 to increase the angle of incidence of the wings, causing the plane to rise. Since the point of suspension of the body 1 is at the upper end of fin 4, the center of gravity of the body is relatively low, and the deviation of the body from a horizontal longitudinal line due to increase or decrease in the pulling force exerted on cable 13 is accordingly small. It is apparent that the airfoils 9 may be very light in weight because the lifting forces are transmitted directly to the tensile member 5 and all the structural members used in a conventional plane to produce a rigid unit are omitted. It appears therefore that a kite balloon of comparatively small size is required to lift all of the wings. However, the airplane is operative and safe if the capacity of balloon 12 is merely sufficient to lift the topmost airfoil. Lift of the latter is thereby assured during flight so that it lifts the other airfoils and the plane is prevented from collapsing.

While the airplane is in forward flight the lift cable 5 slopes upwardly and backwardly, pointing in the direction of the resultant of the lift and the drag. Supposing now that the operator desires to make a turn and therefore operates rudder bar 19 to cause turning of body 1, the direction of the propeller thrust is changed so that the flight of the body deviates from the original course, causing a change in the direction of pull in cable 5 and the alignment of the carrying surfaces by virtue of fins 10. The alignment is accelerated due to the action of control cable 13 whose tendency is to urge longerons 11 into alignment with body 1.

Due to the extreme height of the plane and the low position of the center of gravity, a pendulum action may result. Its frequency depends on the height of the plane and is accordingly very low. The pendulum action in a lateral direction is prevented by fins 4 and 18 whose size also determines the minimum turning radius of the aircraft. The pendulum action fore and aft may be broken by the operator by manipulation of the throttle, particularly since the oscillation is extremely slow.

The operation of the flying machine employing the modified carrying surfaces as shown in Fig. 3 is similar to that described in connection with Fig. 1, except that the direction of the gyroplanes is indifferent, control cable 13 being dispensed with. While in the construction shown in Fig. 1 the ascent or descent of the flying machine is controlled by operation of the control stick 14, in a construction incorporating the modification shown in Fig. 3, the ascent or descent can be controlled by the thrust of propeller 2 whereby an increase of power would cause the flying machine to climb.

While in the illustrated embodiment I have shown only a small number of carrying surfaces the number of planes or lifting screws may be greatly increased.

Having thus described my invention, I claim:

1. A flying machine comprising streamlined lighter-than-air lifting means, flexible tension lines suspended from said lighter-than-air lifting means, said airfoils being pivoted to swing about a lateral axis forward of the center of pressure, a fuselage suspended at the lower end of said tension lines, said fuselage having a power plant, propelling means driven by said power plant, and directional control means operable by the pilot, and a plurality of superposed airfoils pivotally secured to said tension lines intermediate said fuselage and said lighter-than-air lifting means.

2. The construction as claimed in claim 1, and means operable by the pilot to control one of said tension lines to change the pitch of said airfoils.

WILLIAM STELZER.